United States Patent
Martin-Martinasso et al.

(10) Patent No.: US 11,487,980 B2
(45) Date of Patent: Nov. 1, 2022

(54) RECHARGING AN EMBEDDED BATTERY IN A SMART CARD

(71) Applicant: IDEMIA FRANCE, Courbevoie (FR)

(72) Inventors: Ludovic Martin-Martinasso, Courbevoie (FR); Aissa Waknioun, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 426 days.

(21) Appl. No.: 16/598,959

(22) Filed: Oct. 10, 2019

(65) Prior Publication Data

US 2020/0117970 A1 Apr. 16, 2020

(30) Foreign Application Priority Data

Oct. 12, 2018 (FR) ...................................... 1859466

(51) Int. Cl.
*H02J 7/00* (2006.01)
*G06K 19/07* (2006.01)
*G06K 7/04* (2006.01)

(52) U.S. Cl.
CPC ......... *G06K 19/0704* (2013.01); *G06K 7/042* (2013.01); *H02J 7/007* (2013.01)

(58) Field of Classification Search
CPC .. G06K 19/0704; G06K 7/042; G06K 7/0013; H02J 7/007
USPC ....................................................... 235/441
See application file for complete search history.

(56) References Cited

U.S. PATENT DOCUMENTS

| 2007/0257100 A1* | 11/2007 | Chase-Salerno ............................ G06Q 20/35765 235/492 |
| 2007/0285227 A1* | 12/2007 | Timothy ............... G06F 1/1696 340/539.13 |
| 2010/0259216 A1* | 10/2010 | Capomaggio ...... G06K 7/10237 320/108 |

(Continued)

FOREIGN PATENT DOCUMENTS

| CN | 107767139 A | * 3/2018 | ........... G06Q 20/341 |
| CN | 109038863 A | * 12/2018 | .............. H02J 50/10 |

(Continued)

OTHER PUBLICATIONS

French Preliminary Search Report issued in corresponding French Patent Application No. 1859466 dated Jun. 25, 2019, pp. 1-11.

(Continued)

*Primary Examiner* — Steven S Paik
*Assistant Examiner* — Tae W Kim
(74) *Attorney, Agent, or Firm* — MH2 Technology Law Group, LLP

(57) ABSTRACT

Devices and methods for recharging an embedded battery in a smart card, including a control method implemented by a smart card (CD1) including a rechargeable battery (8). The control method may include operations for processing a transaction (TR1) with a terminal (T); receiving during this transaction a predetermined transaction command requiring a processing time, by the smart card, long enough to allow a recharging of the battery to at least a first predetermined threshold charge level; and, upon detection (S32) of this transaction command, triggering the recharging of the battery (8) by a power supply delivered by the terminal (T) to reach at least the first predetermined threshold charge level.

15 Claims, 7 Drawing Sheets

(56) References Cited

U.S. PATENT DOCUMENTS

2016/0004945 A1* 1/2016 Wade ................ G06K 19/0704
235/492
2018/0205250 A1* 7/2018 Zhang ..................... H02J 7/045

FOREIGN PATENT DOCUMENTS

WO      2016168457 A1    10/2016
WO   WO-2018057705 A1 *  3/2018

OTHER PUBLICATIONS

European Search Report issued in correspnding European Patent Application No. 19201547.7 dated Feb. 17, 2020, 10 pages.

* cited by examiner

RECHARGING AN EMBEDDED BATTERY IN A SMART CARD

CROSS-REFERENCE TO RELATED APPLICATIONS

This application claims priority to French Application No. 1859466 filed 12 Oct. 2018, which is hereby incorporated by reference in its entirety.

BACKGROUND OF THE INVENTION

The present invention lies in the general field of smart cards and relates more particularly to the electrical recharging of smart cards including a battery.

The invention applies more particularly, but not exclusively, to the smart cards in accordance with the ISO 7816 standard. The invention aims in particular to the recharging of a battery embedded in a smart card operating according to the EMV (Europay Mastercard Visa) protocol, although other protocols are possible as explained later.

Generally, a smart card is designed to communicate with a device external to this card, otherwise called terminal or reader. The smart cards make it possible to carry out various types of transactions such as, for example, payment, direct debit or holder authentication transactions. The smart cards for banking applications (credit card, debit card etc.), for example, are able to cooperate with payment terminals or automated teller machines (ATM) to carry out various financial operations.

To carry out a transaction, the smart card holder generally must insert the card in a reader (contact mode) or, where necessary, may present his card in the vicinity of the reader in order to establish a contactless communication with the reader (contactless mode).

In known manner, a smart card includes an electronic chip embedded in a card body. If the smart card is intended to communicate by contact with a reader, it has external contacts disposed on the surface of the card body and configured to cooperate by contact with a reader provided for this purpose. Furthermore, if the smart card is intended to communicate without contact with a reader, it embeds in particular a radio frequency (RF) antenna to exchange RF signals with the reader.

More recently, new smart cards have emerged, these can embed various components more or less complex allowing the implementation of additional features. Some smart cards embed for example a screen, an indicator light, a button or a biometric sensor.

Such embedded components in a smart card, however, require a significant power supply to be able to operate. The growing resources and capacities of the smart cards are therefore accompanied by a significant increase in their power consumption.

To this end, these smart cards can also embed a cell serving as an internal power supply source, but the use of a cell is not always adapted insofar as it is generally not possible to recharge it, which consequently limits the lifetime of the smart card.

To meet the growing needs in terms of power supply, it is also known to integrate a rechargeable battery in a smart card. It has been found, however, that the recharging of such a rechargeable battery in a smart card is generally not managed in a satisfactory manner, which limits the efficiency of the battery and reduces its lifetime.

There is therefore a need for a solution for electrically powering in an effective manner at least one embedded electronic component in a smart card. Particularly, there is a need to recharge effectively a battery embedded in a smart card in order in particular to optimize the performances of the battery, and consequently, of the smart card.

OBJECT AND SUMMARY OF THE INVENTION

As indicated above, the management of the power supply in the smart cards embedding an internal battery is not satisfactory today. The increase in the complexity of the smart cards, and particularly the integration of more and more numerous and complex components (sensors, screens . . . ), lead to a significant increase in the power consumption in these cards.

The significant technical constraints, in particular with regard to the reduced space available in smart cards, make the management of the embedded batteries even more complicated.

In the life of a battery, the latter experiences alternation of recharge phases and discharge phases.

FIG. 1 schematically illustrates a graph GP, representing the charge level NC of a battery over time in one particular example, this battery being for example embedded in a smart card.

In this document, the charge level NC of a battery is defined in percentage (%) with respect to the total charge level it can intrinsically withstand.

As represented in FIG. 1, at a given instant t, the battery is inherently discharged over time and must therefore be recharged regularly to maintain a sufficient charge level NC to allow a normal use of the smart card. Over time, the charge level NC passes through a series of cycles CL, called "recharge cycles" or "recharge/discharge cycles", each of these cycles being defined by two consecutive phases, namely: a recharge phase and a discharge phase. As indicated later, the recharge and discharge phases of a cycle are not necessarily complete. A recharge cycle can have various charge level NC amplitudes (maximum amplitude: from 0 to 100%).

The change in the charge level NC depends on various factors including in particular: the characteristics of the battery, its environment, its use . . . . During a recharge phase, the battery undertakes an energy collection process for increasing the charge level NC, the change in the charge level NC, dependent particularly on the recharge time and on the power supply provided to the battery.

In the example represented in FIG. 1, the battery is thus subjected to 4 successive recharge cycles CL1-CL4:

Cycle CL1 (between t0 and t2): the battery experiences a recharge phase between the times t0 and t1 increasing its charge level NC by 60%, then a discharge phase between t1 and t2;

Cycle CL2 (between t2 and t4): the battery experiences a recharge phase between the times t2 and t3 increasing its charge level NC by 50%, then a discharge phase between t3 and t4;

Cycle CL3 (between t4 and t6): the battery experiences a short recharge phase between the times t4 and t5 and then a discharge phase between t5 and t6: and Cycle CL4 (between t6 and t8): the battery experiences again a short recharge phase between the times t6 and t7 and a discharge phase between t7 and t8.

The configuration of each recharge cycle CL (the peak shape representing the change in the charge level NC) may vary depending on the case. It is common for a battery not to reach its maximum charge level NC during a recharge phase. Similarly, the complete depletion of a battery is generally avoided during a discharge phase.

As represented in FIG. 1, micro-recharging operations such as those carried out during the cycles CL3 and CL4 are possible, during which a very small increase (of 0.5 or 1%, for example) in the charge level NC of the battery is achieved. This phenomenon of micro-recharging can have various origins.

However, it has been observed that such micro-recharging operations have indeed a detrimental effect on the performances of a battery, and in particular a battery embedded in a smart card. The batteries are also generally capable of withstanding a limited number of recharge cycles during their lifetime (this number ranging for example between 300 and 500 recharge cycles). Once this critical number of cycles is reached, the performances of the battery, and particularly the battery life, decrease substantially.

To effectively recharge a battery embedded in a smart card, it has been observed that it is necessary to deliver a stable power supply for a sufficient period of time to allow the battery to reach a predetermined threshold charge level (which can be below or equal to its nominal capacity). Particularly, the power supply must not be interrupted early before reaching this threshold charge level, which then allows ensuring the supply of the smart card without external energy source to perform one or several operations (financial transaction, authentication, Bluetooth communication, display of a dynamic cryptogram . . . ).

It has been envisaged to recharge the internal battery of a smart card by using an external terminal with which the smart card cooperates by contact to process an EMV-type transaction or the like. However, the recharging of the battery is not always satisfactory because it is difficult to ensure a stable supply of the battery by the external terminal. Indeed, during an EMV transaction for example, the exchanges between the external terminal (the reader) and the smart card are very variable and are subject to fluctuations or interruptions during the recharging process of the battery. Thus, during certain processing operations carried out by a smart card during an EMV transaction (including cryptographic processing operations), the power consumption of the smart card can increase considerably, thus limiting the power supply that remains available to recharge the embedded battery.

The instability of the supply, and more particularly the interruption of a recharge phase, degrade the results in terms of recharging and accelerate the aging of the battery, thus reducing its lifetime.

The invention therefore aims at improving the management of the electrical recharging of a battery embedded in a smart card, taking into account in particular the constraints and observations indicated above.

To this end, the present invention relates to a control method implemented by a smart card including a rechargeable battery, the method comprising:
  processing a transaction during which the smart card communicates with an external terminal with which said smart card is coupled;
  receiving, during said processing of the transaction, a predetermined transaction command requiring a processing time, by said smart card, long enough to allow a recharging of the battery to at least a first predetermined threshold charge level; and
  upon detection of said predetermined transaction command, triggering the recharging of the battery by using a power supply delivered by the external terminal to reach at least the first predetermined threshold charge level.

The invention makes it possible to implement an intelligent electrical recharging of the battery, as explained below.

According to one particular embodiment, the first predetermined threshold charge level corresponds to at least 50% of the maximum charge capacity of the battery. It is thus possible to avoid the micro-charging operations of the battery and therefore to optimize the battery performances and life.

According to one particular embodiment, the smart card triggers said recharging upon receipt of said transaction command, only if the current charge level of the battery is below or equal to a predetermined minimum charge level.

According to one particular embodiment, the transaction is a payment transaction of the type EMV, MONEO or GELDKARTE.

According to one particular embodiment, the transaction is an EMV-type transaction, said predetermined transaction command being one among the following APDU commands within the meaning of the EMV standard: GPO, GAC and VERIFY PIN.

According to one particular embodiment, the transaction is a MONEO-type transaction, said predetermined transaction command being one among the following APDU commands: DEBIT, DEBIT REVERSAL and VERIFY PIN;

According to one particular embodiment, the transaction is a GELDKARTE-type transaction, said predetermined transaction command being one among the following APDU commands: DEBIT and REPAYMENT.

According to one particular embodiment, the method further comprises stopping the recharging of the battery upon detecting that the charge level of the battery has reached a second predetermined threshold charge level. This second threshold charge level is greater than or equal to the first threshold recharge level.

According to one particular embodiment, the power supply is received, from the external terminal, by external contact.

According to one particular embodiment, the smart card is of the type ISO 7816, the power supply being received, from the terminal, by contact via the contact Vcc connected to the external terminal.

According to one particular embodiment, the smart card triggers the recharging of the battery, simultaneously by contact and without contact, from the external terminal.

According to one particular embodiment, the method further comprises, prior to said triggering of the recharging of the battery: upon detecting that the charge level of the battery is below a third threshold charge level, sending to the external terminal a first command requiring that the transaction is processed by contact.

According to one particular embodiment, the method further comprises, prior to said triggering of the recharging of the battery: upon detecting that the charge level of the battery is below the third threshold charge level, sending a second command to a user interface of the smart card to create the presentation to a user of a notification indicating that the transaction must be processed by contact.

According to one particular embodiment, the method further comprises: sending to the external terminal a timing command requiring that the external terminal artificially extends a processing time necessary to carry out a processing during said transaction, so as to allow carrying out said recharging of the battery.

According to one particular embodiment, the transaction is of the EMV type, the timing command requiring the extension of a processing time used by said external terminal to perform a processing within the limits authorized by the EMV standard.

According to one particular embodiment, the smart card comprises a non-rechargeable cell, the method further comprising: upon detecting that the charge level of the battery is below a fourth threshold charge level, triggering the recharging of the battery from the cell to supplement or complement the power supply delivered by the external terminal. The fourth threshold charge level is for example below or equal to the first threshold charge level.

According to one particular embodiment, upon detecting that the charge level of the battery increases until reaching a fifth threshold charge level, interrupting the recharging of the battery by the cell so that the recharging of the battery continues only from the power supply delivered by the external terminal. The smart card can thus switch back only to the supply of the terminal in order to preserve the internal cell of the smart card and thus extend its lifetime.

In one particular embodiment, the different steps of the control method are determined by computer program instructions.

Consequently, the invention also aims a computer program on an information medium (or recording medium), this program being likely to be implemented in a smart card, or more generally in a computer, this program including instructions adapted to the implementation of the steps of a control method as defined in this document.

This program can use any programming language, and be in the form of source code, object code, or intermediate code between source code and object code, such as in a partially compiled form, or in any other desirable form.

The invention also aims a computer-readable information medium (or recording medium), and including instructions of a computer program as mentioned above.

The information medium may be any entity or device capable of storing the program. For example, the medium may include a storage means, such as a ROM, for example a CD ROM or a microelectronic circuit ROM, or a magnetic recording means, for example a floppy disc or a hard disk.

On the other hand, the information medium may be a transmissible medium such as an electrical or optical signal, which may be conveyed via an electrical or optical cable, by radio or by other means. The program according to the invention can be particularly downloaded on an Internet type network.

Alternatively, the information medium may be an integrated circuit in which the program is incorporated, the circuit being adapted to execute or to be used in the execution of the method in question.

The invention also aims a corresponding smart card. More particularly, the invention relates to a smart card comprising:
  a rechargeable battery;
  a processing module configured to process a transaction during which the smart card communicates with an external terminal with which said smart card is coupled;
  a communication module configured to receive, during said processing of the transaction, a predetermined transaction command requiring a processing time, by said smart card, long enough to allow a recharging of the battery to at least a first predetermined threshold charge level; and
  a control module configured, upon detecting that said predetermined transaction command is received, to trigger the recharging of the battery by using a power supply delivered by the external terminal in order to reach at least the first predetermined threshold charge level.

Note that the various embodiments mentioned in this document in relation to the control method of the invention as well as the associated advantages apply in a similar manner to the smart card of the invention. For each step of the control method of the invention, the smart card of the invention may comprise a corresponding module configured to perform said step.

According to one embodiment, the invention is implemented by means of software and/or hardware components. In this context, the term "module" may correspond in this document both to a software component and to a hardware component or to a set of hardware and software components.

A software component corresponds to one or several computer programs, one or several subroutines of a program, or more generally to any element of a program or software able to implement a function or a set of functions, according to what is described in this document for the module concerned.

In the same way, a hardware component corresponds to any element of a hardware set able to implement a function or a set of functions, according to what is described in this document for the module concerned. It can be a programmable hardware component or with an integrated processor for running the software.

SHORT DESCRIPTION OF THE DRAWINGS

Other characteristics and advantages of the present invention will appear from the description given below, with reference to the appended drawings which illustrate therefrom examples of embodiment without limitation. In the figures:

FIG. 1 schematically represents the change in the charge level of a battery during successive recharge cycles;

FIG. 2 is a diagram generally describing the processing of a transaction according to the EMV protocol;

FIG. 3 schematically represents an environment comprising a smart card according to one particular embodiment of the invention;

FIG. 4 schematically represents the functional modules implemented by a smart card according to one particular embodiment of the invention;

FIG. 5A represents, in the form of a diagram, the steps of a control method according to one particular embodiment of the invention;

FIG. 5B schematically represents a control method according to one particular embodiment;

DETAILED DESCRIPTION OF SEVERAL EMBODIMENTS

Figure 1:
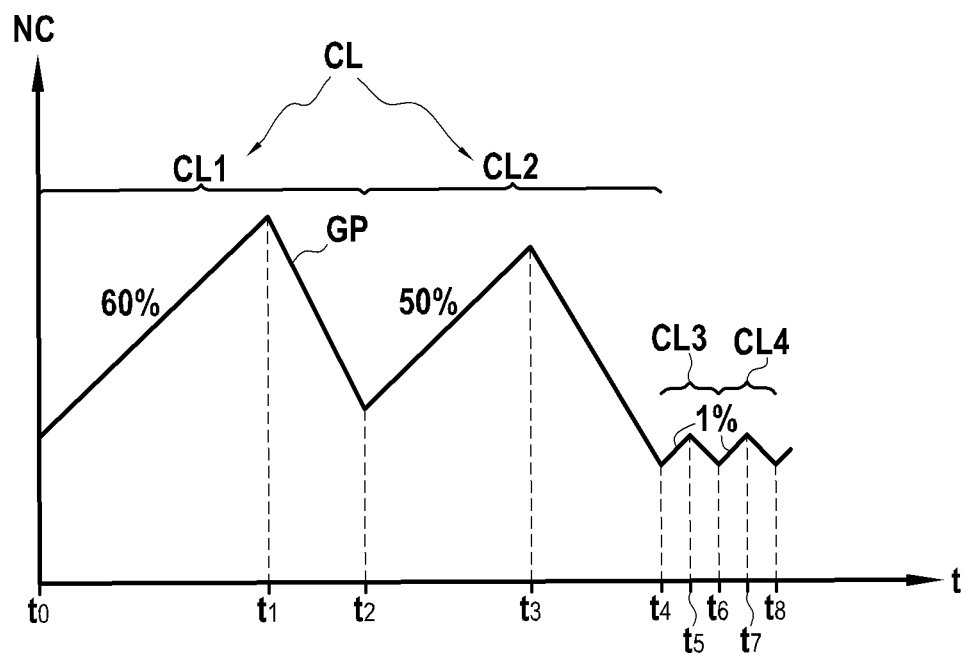

As indicated above, the invention relates to the management of the power supply in a smart card (also called "microcircuit card") embedding a rechargeable battery, and relates more particularly to the electrical recharging of such an embedded battery.

The invention proposes to optimize the electrical recharging process of an internal battery with which a smart card is equipped.

The invention, according to various embodiments, relates to a control method implemented by a smart card embedding at least one rechargeable battery. The smart card can process a transaction with an external terminal and, upon detection of a predetermined transaction command coming from the external terminal, the smart card is configured to trigger the recharging of the battery by using a power supply delivered by the external terminal.

Particularly, the invention aims a control method implemented by a smart card including a rechargeable battery, the method comprising: a processing of a transaction during which the smart card communicates with an external terminal with which said smart card is coupled; receiving, during said processing of the transaction, a predetermined transaction command requiring a processing time, by said smart card, long enough to allow a recharging of the battery to at least a first predetermined threshold charge level; and, upon detection of said predetermined transaction command, triggering the recharging of the battery by using a power supply provided by the external terminal to reach at least the first predetermined threshold charge level.

As explained below, the invention allows implementing an intelligent electrical recharging of the battery. The smart card is indeed capable for controlling the recharging of the battery, from the supply delivered by the external terminal, at the most appropriate moment during the current transaction, that is to say the moment offering the best conditions of stability of the power supply as well as a limited risk that the recharging will be interrupted early, before completion of the recharging process. To do so, the smart card of the invention triggers the recharging upon detection of a predefined transaction command, which allows choosing an optimal period of time in the course of the transaction to perform the recharging. Thanks to the invention, the phase of the transaction during which the recharging is performed is selected so as to ensure a certain stability of the power supply for a time sufficient to the embedded battery to reach a desired charge level, and this by limiting the risks of an unexpected interruption of the recharging process.

The invention also aims the corresponding smart card, as well as the corresponding computer program.

Other aspects and advantages of the present invention will appear from the examples of embodiment described below with reference to the drawings mentioned above.

In this document, examples of implementation of the invention are described within the context of a smart card in accordance with the ISO 7816 standard, although other implementations are possible.

Likewise, a smart card in accordance with the EMV standard is subsequently considered. As indicated in more detail later, however, it will be understood that the invention does not apply exclusively to the EMV standard but may apply to other protocols, such as MONEO™ or GELDKARTE™ payment protocols, for example.

EMV is the standardized protocol used today mainly in the world to secure in particular the payment transactions made by smart cards.

The EMV protocol has been designed to reduce the risks of frauds during a payment transaction by allowing in particular the authentication of both the smart card and its holder. This authentication process uses a combination of cryptograms (or encrypted keys) and digital signatures and requires possibly the entry of a secret code (commonly called PIN code) by the cardholder.

Depending on the type of smart card used, the situation, or the amount considered, an EMV card can work online or offline. In online mode, the EMV card communicates, via the reader, with a remote server (a server of the card-issuing bank, for example) in order to verify the validity of the current transaction. However, if the EMV card is operates in offline mode, it applies prerecorded verification criteria to decide whether the transaction should be authorized or refused.

Unless otherwise indicated, the elements common or similar to several figures bear the same reference signs and have identical or similar characteristics so that, for the sake of simplicity, these common elements are generally not described again.

The notion of transaction is here understood in a broad sense and comprises, for example, in the banking field, both a payment or transfer transaction and a consultation of a bank account on a bank terminal. The invention is described here as part of a payment card intended to carry out banking transactions according to the EMV protocol. It will be understood that other types of transactions or operations are conceivable within the context of the invention.

In order to facilitate the understanding of the invention, an example of a processing of a transaction in accordance with the EMV protocol, carried out by a smart card 100 in cooperation with an external terminal (or reader) 110, is described now with reference to FIG. 1. The terminal 2 is able to communicate with a bank server 120 associated with the issuer of the smart card 100. In this example, the smart card 100 is a payment card and the reader 110 is a payment terminal.

As indicated below, the smart card 100 operates here in a mode with verification of the secret code (PIN code) although it is possible to consider variants according to which the smart card 100 does not proceed to the verification of the secret code (mode without verification of the secret code).

A payment EMV smart card can contain different banking applications, allowing for example to operate in "credit card" or "debit card" mode in a point-of-sale or to interact with an automated teller machine.

It is assumed here that the holder inserts the smart card 100 in the terminal 110 or initiates a contactless transaction, denoted TR0, by presenting the smart card 100 in the vicinity of the terminal 110.

The EMV protocol comprises a preliminary PHP phase intended to prepare the smart card 100 and the reader 110 for the implementation of the transaction TR0. Different transaction messages in accordance with the EMV protocol are exchanged between the smart card 100, the terminal 110 and (in this example) the bank server 120 during the transaction TR0.

More specifically, during the preliminary phase PHP, the terminal 110 transmits (E2) a RESET message (RST) to the payment card 100. The latter responds (E4) thereto by an ANSWER TO RESET message (ATR).

The receipt of the command RST (E2), by the smart card, marks the beginning of the EMV transaction.

The terminal 110 then tries to choose the appropriate application on the payment card 100. To do so, the terminal 110 sends (E6) to the smart card 100 a SELECT FILE command in order to ask the smart card for the applications that the latter is able to execute. In response, the smart card 100 transmits (E8) to the reader 2 a list of the different applications that it can implement. The holder can then select via the terminal 110 the desired transaction mode, thus triggering the sending (E10) to the smart card 100 of a SELECT APPLICATION command with the identifier of the selected application as parameter.

The terminal 110 then sends (E10) a GET PROCESSING OPTIONS (GPO) command, well known to those skilled in the art, to the smart card 100.

In response, the smart card 100 sends (E14) to the terminal 110 a first series of information, such as the AIP (Application Interchange Profile) which indicates to the terminal 110 the different operations to be carried out to complete the transaction. The card 100 also sends (E16) an AFL (Application File Locator) message which indicates the list of data available at the application in the smart card 100 and that the terminal 110 must read to be able to carry out the transaction TR0. The terminal 110 reads (E18-E20) thus the information specified in the AFL. To do so, the terminal 110 sends (E18) one or several READ RECORD read commands to the smart card 100 and receives back (E20) the requested information (called RECORDS).

The information read (E18-E20) by the terminal 110 in the smart card 100 comprise for example the expiration date of the smart card 100, the associated account number, a digital signature to authenticate the card 100, control parameters to be used thereafter to perform the transaction, and/or lists of objects called CDOL lists (Card Data Object List).

Various embodiments can be considered. In this example, the terminal 110 performs (E22) then an analysis step from the information provided (E20) by the smart card 100. If the authentication associated with the smart card 100 fails, if an anomaly is detected or if too much risk is detected, the terminal 110 may refuse the transaction. It is assumed here that the analysis E22 was made successfully.

The processing of the transaction TR0 according to the EMV protocol continues with an authentication phase of the holder of the smart card 100 according to one of the methods listed and supported by said card. The terminal 110 determines the holder authentication method to be applied based on the information previously received in the control parameters. This phase allows particularly the terminal 110 to determine whether the transaction is performed in a mode with verification of the PIN code or in a mode without verification of the PIN code.

In this example, where the mode with verification of the PIN code is implemented, the holder is invited to enter his PIN code using the keyboard with which the terminal 110 is generally provided. The terminal 110 sends (E24) then to the smart card 100 a VERIFY PIN request for verifying the PIN code entered by the holder. The smart card 100 compares (E26) then the PIN entered by the holder with a reference PIN code stored in its memory and deduces therefrom whether the holder is authentic or not.

If the entered PIN code is valid, the smart card 100 transmits (E28) a positive authentication message OK to the terminal. Otherwise, the card sends (E28) a refusal message to the terminal 110. There is here an interest only for the case of an offline PIN code verification that is to say without the terminal 110 using the smart card issuer in the PIN code verification process, although this is also possible.

Once the holder is authenticated, the EMV protocol continues with a verification phase of the transaction TR0. More specifically, the terminal 110 generates and then sends (E30) to the smart card 100 a GAC command (GENERATE AC or Generate Application Cryptogram) well known to those skilled in the art. This GAC command may comprise various data previously requested by the smart card 100.

Typically, the GAC command contains information such as at least one among the amount of the current transaction, the currency used, the type of transaction, etc.

In response to the GAC command, the smart card 100 performs (E32) an analysis step, also called CRM (Card Risk Management), comprising certain predetermined security verifications. The number and the nature of these verifications are not standardized by the EMV protocol and may vary from case to case.

At the end of the analysis E32, the smart card 100 responds to the terminal 110 by sending (E34) a cryptogram (or cryptographic certificate). The response of the card depends in particular on the setting of the card 100 made by the issuing bank.

In this example, the smart card 100 transmits (E34) an ARQC cryptogram (Authorization Request Cryptogram) indicating that the smart card wishes to continue the online transaction with the bank server 120 of the issuer of the card. The online processing of an EMV transaction allows a remote server (here the bank server 120) to perform complementary verifications.

The terminal 110 thus transmits (E36) the ARQC cryptogram to the bank server 120 at which an analysis is made (E38) from the received information. This analysis E38 typically comprises a number of verifications to ensure that the transaction is valid. The terminal 110 receives (E40) in response an encrypted ARPC message indicating the decision of the issuer. The terminal 110 transmits (E42) this ARPC message to the payment card 100 in order to indicate thereto the decision taken by the issuer.

If the smart card 100 accepts the transaction, the latter sends (E44) in response a TC (accepted transaction) type cryptogram to the terminal 110. Otherwise, the smart card 100 sends (E44) an AAC-type cryptogram indicating the refusal of the transaction.

The messages exchanged according to the EMV protocol, in particular between the smart card 100 and the terminal 110, constitute transaction messages intended to allow the processing of a transaction by the smart card 100 in cooperation with the terminal 110.

Figure 2:
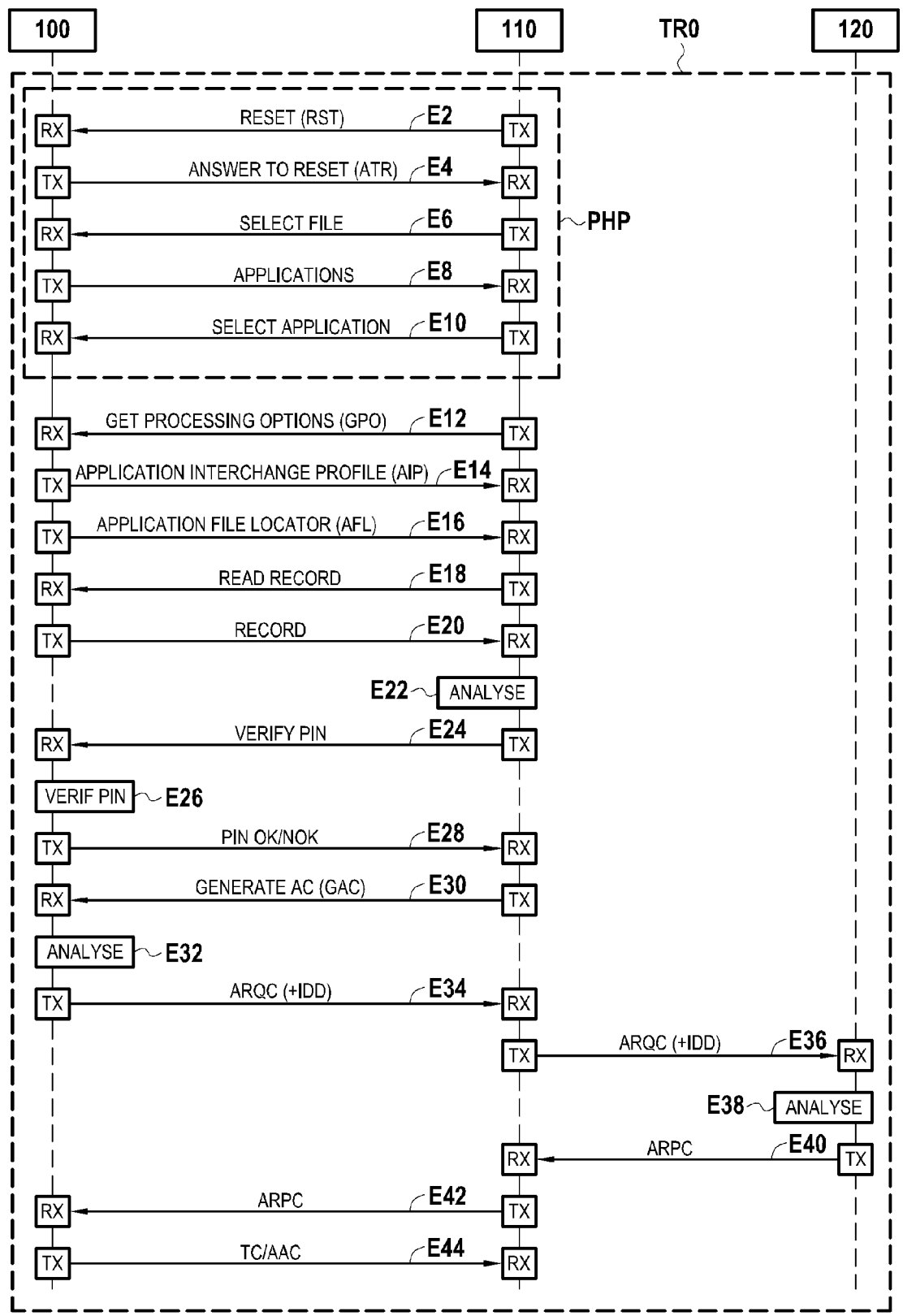

It should be recalled here that the progress of the EMV protocol described above with reference to FIG. 2 constitutes only a non-limiting example. The EMV protocol offers indeed many alternatives. It is up to the integrators to make the necessary choices to adapt the execution of the protocol as needed (holder authentication method, online or offline transaction, etc.).

Figure 3:
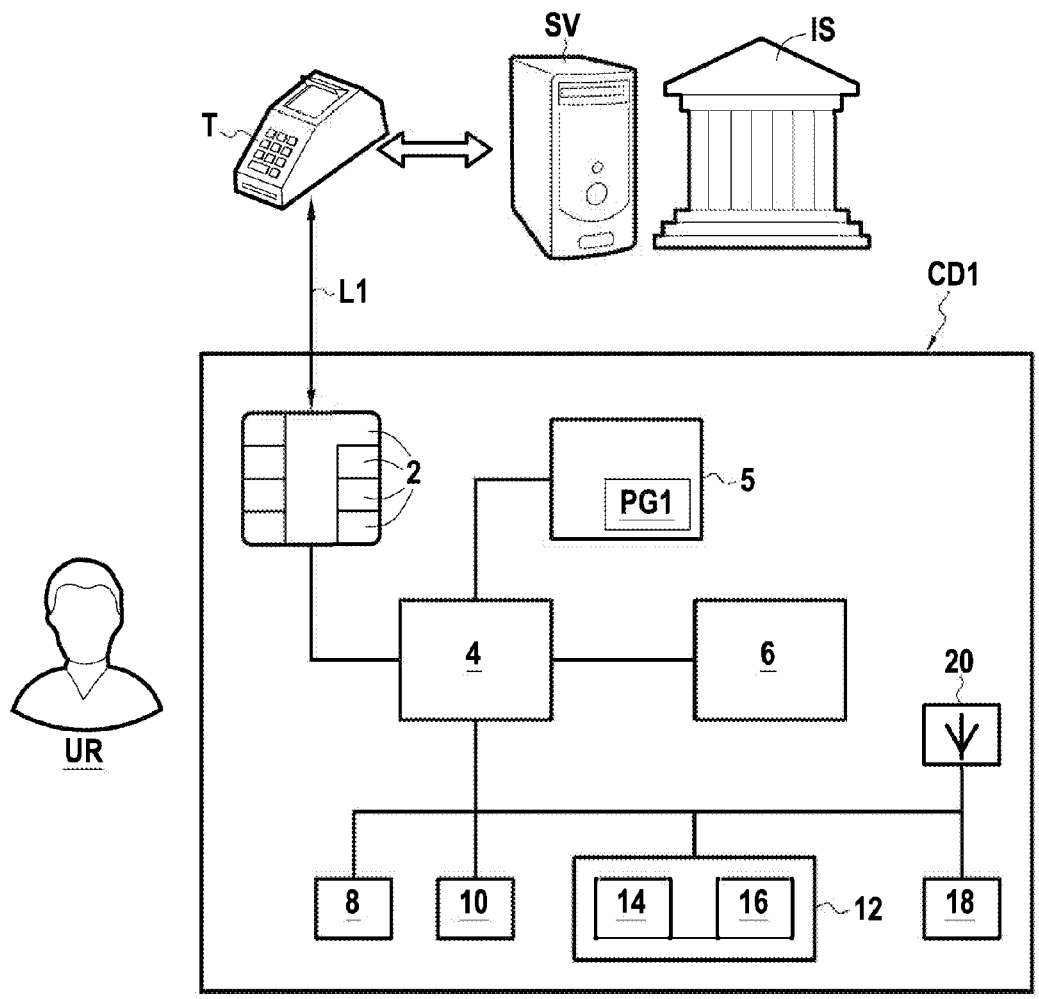

With reference to FIG. 3, a smart card CD1 is now described according to one particular embodiment of the invention. In this example, the smart card CD1 is a payment card (or bank card) configured to process payment transactions according to the EMV protocol. As already indicated, other types of protocols and other types of transactions are however possible within the context of the invention.

The smart card CD1 is configured to cooperate with an external terminal T to perform EMV transactions. The external terminal T can interface between the smart card CD1 and a remote server SV managed by the issuer IS of the smart card CD1.

In this example, the smart card CD1 comprises external contacts 2 in accordance with the ISO 7816 standard to cooperate by contact with the external terminal T. It is assumed here that the smart card CD1 can also communicate with the terminal T in contactless mode, by using an RF antenna 20 which is also possibly embedded in the smart card CD1, although this is not mandatory. The invention applies to the smart cards configured to operate only by contact, to the smart cards configured to operate only in contactless mode and to the smart cards configured to operate in contact mode and in contactless mode (cards smart with dual communication interfaces).

The smart card CD1 further comprises a first processor 4, a non-volatile memory 5, a second processor 6, a rechargeable battery 8 and possibly at least one additional component such as a sensor 10 (a biometric sensor for example) and/or a user interface 12. In this example, the user interface comprises for example at least one light-emitting diode (LED) 14 and/or one screen 16, of the electronic paper (or "e-paper") type for example. Other configurations are however possible.

The nature and the number of these additional components may vary from case to case. Each of these additional components may be electrically powered by the battery 8. Optionally, the smart card CD1 may also comprise a (non-rechargeable) cell 18 configured to recharge the battery and/or to power the additional components as an alternative power source.

The first processor 4 controls the other internal components of the smart card CD1 by using in particular its non-volatile memory 5 and a random access memory (not represented).

The memory 5 is a rewritable non-volatile memory or a read only memory (ROM), this memory constituting a recording medium (or information medium) according to one particular embodiment, readable by the smart card CD1, and on which a computer program PG1 is recorded according to one particular embodiment. This computer program PG1 includes instructions for performing the steps of a control method according to one particular embodiment. Examples of implementation of this method are described in more detail later with reference to the figures.

The second processor 6 is in this example an EMV processor configured to process transactions according to the EMV protocol.

The internal battery 8 (also called "accumulator battery") includes in a well-known manner a plurality of electrical accumulators (or cells) connected together so as to form an electric voltage generator.

Various types of battery can be considered within the context of the invention, insofar as this battery can be sufficiently compact to be embedded in a smart card. The battery 8 may be in particular according to any of the following types: Lithium-ion, Lithium-Polymer, super-capacitor . . . .

At least one super-capacitor (or super-capacitance) can further be embedded in the smart card CD1 to collect the power supply delivered during a recharging and transmit it later gradually to the battery 8. The smart card CD1 can thus implement a mechanism involving a super-capacitor to recover energy from the external terminal T for a short time, the collected energy being used later to recharge the battery. In this case, the method of the invention allows recharging the embedded super-capacitor at an appropriate moment during a transaction, with a view to using subsequently this super-capacitor in order to recharge the battery 8. It can also be considered that the smart card CD1 comprises in this case a battery system comprising the battery 8 and the super-capacitor, this battery system being rechargeable according to the principle of the invention.

The smart card can be configured to use the RF antenna 20 (if the latter present in the smart card) to cooperate in contactless mode with the terminal T. The RF antenna 20 can be configured to collect inductively electrical energy to electrically power the battery 8. As explained below, the RF antenna 20 can thus be used to recharge at least part of the battery 8 from the terminal T.

It will be understood that certain elements generally present in a smart card have been deliberately omitted because they are not necessary to understand the present invention.

It should also be noted that the smart card CD1 represented in FIG. 3 constitutes only one example of embodiment, other implementations being possible within the context of the invention. Those skilled in the art understand particularly that certain elements of the smart card CD1 are described here only to facilitate understanding of the invention, these elements are not necessary to implement the invention.

Figure 4:
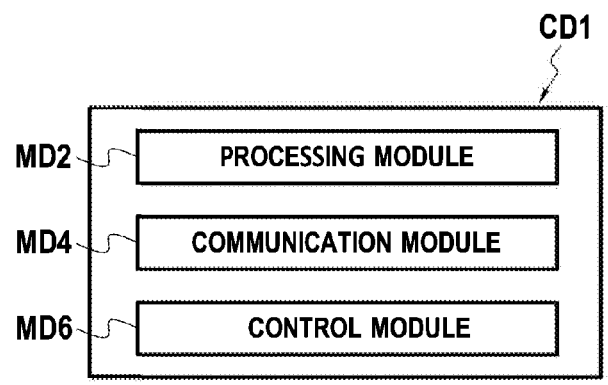

The first processor 4 driven by the computer program PG1 here implements a number of modules represented in FIG. 4, namely: a processing module MD2, a communication module MD4 and a control module MD6.

The processing module MD2 is configured to process a transaction (of the EMV type in this example) during which the smart card CD1 communicates with the external terminal T with which the smart card is coupled. In the example considered here, the processing module 4 is implemented by both the first processor 4 and the second processor 6.

The communication module MD4 is configured to receive, during the processing of a transaction by the processing module MD2, a predetermined transaction command coming from the external terminal T. The receipt of this predetermined transaction command indicates to the smart card CD1 the starting of a time range, in the transaction, which is particularly suitable for carrying out the electric recharging of the battery 8.

In one particular example, the communication module MD4 is configured to detect that this predetermined transaction command is such that it requires a processing time, by the smart card CD1, which is long enough to allow a recharging of the battery (by the external terminal T) until reaching at least a first predetermined threshold charge level (denoted hereinafter TH1). This processing time may be inherent to the specifications of the EMV standard and/or to the configuration of the smart card CD1.

As indicated below, the first predetermined threshold charge level is chosen large enough to avoid the above-described phenomena of micro-recharging which are detrimental to the battery performances and life. According to one particular embodiment, this first predetermined threshold charge level corresponds to 50%, or even 55% or 60%, of the maximum charge capacity (nominal charge capacity) of the battery.

The control module MD6 is configured, in response to said predetermined transaction command received by the communication module MD4, to trigger the recharging of the battery 8 by using a power supply delivered by the external terminal T. The recharging can thus be performed until reaching at least the first predetermined threshold charge level.

As indicated below, the predetermined transaction command mentioned above may be suitably chosen by those skilled in the art to trigger the recharging of the battery 8 at a stage of the current EMV transaction offering adequate conditions in particular in terms of stability of the power supply and of duration during which the power supply can be maintained without interruption. There is a risk that the current transaction ends early, due in particular to a problem occurring during the transaction or because the user decides to unexpectedly interrupt the transaction (for example, by uncoupling the smart card from the terminal), thus causing at the same time the end of the recharging. This risk can be limited by choosing, in order to carry out the recharging, a stage of the transaction where it is unlikely that the transaction ends. The recharging process can also be improved by choosing as a recharge period, a part of the transaction ensuring the stability of the power supply delivered by the external terminal T.

The configuration and the operation of the modules MD2-MD6 of the smart card CD1 will appear more precisely in the examples of embodiment described hereinafter with reference to the figures. It is understood that the modules MD2-M6 as represented in FIG. 4 represent only one non-limiting example of implementation of the invention.

Figure 5A:
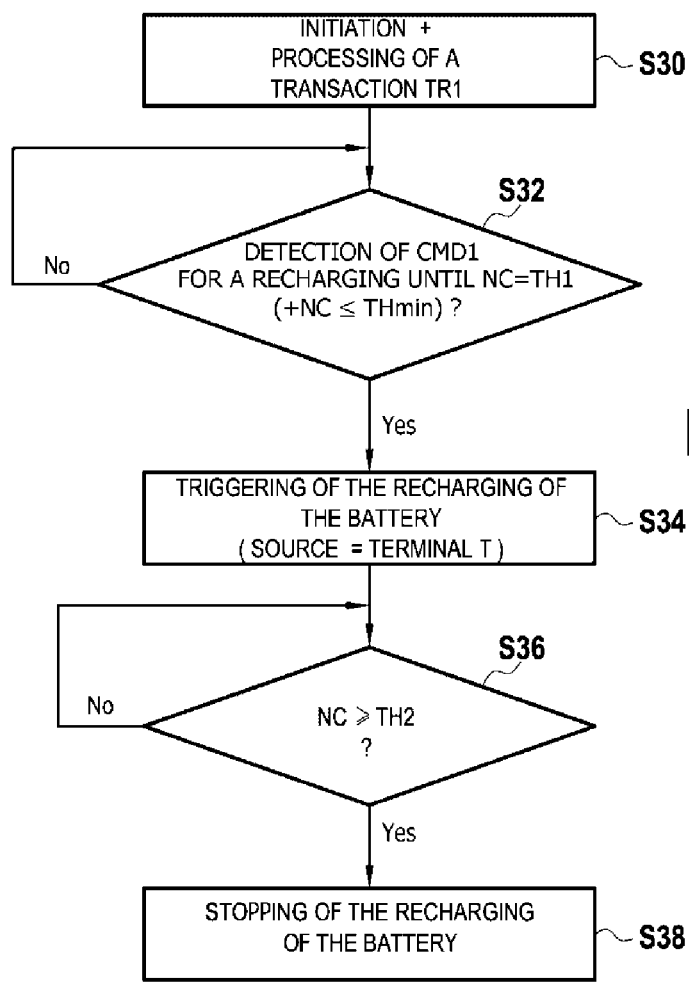

One particular embodiment of the invention is now described with reference to FIGS. 5A and 5B. More specifically, the smart card CD1 described above with reference to FIGS. 3-4 implements, in cooperation with the terminal T, a control method by executing the computer program PG1.

It is assumed that the user UR (FIG. 3) initiates an EMV transaction by cooperating by contact the smart card CD1 with the external terminal T. To do so, the user UR inserts the smart card CD1 into the terminal T taking here the form of a payment terminal.

During a step S30, the smart card CD1 detects the initiation of an EMV-type transaction TR1. The smart card CD1 can, for example, detect the initiation of the transaction TR1 upon receipt of the transaction message RST in accordance with the EMV standard (as already described with reference to FIG. 2, step E2), coming from the terminal T.

The smart card CD1 then processes (S30) the transaction TR1 according to the EMV protocol. To this end, the smart card CD1 is coupled with the external terminal T. In this example, this coupling results in contacting the external contacts 2 of the smart card CD1 with the external terminal T. This coupling is represented by the reference L1 in FIG. 3.

During the processing of the transaction TR1, the smart card CD1 communicates (S30) by contact with the terminal T with which it is coupled. According to another example, it is also possible to communicate the smart card CD1 in contactless mode with the terminal T.

During the processing (S30) of the transaction TR1, the smart card CD1 verifies (S32) if it detects a predetermined transaction command CMD1 coming from the external terminal.

The transaction command CMD1 is predefined so that it indicates to the smart card CD1 the beginning of a period of time, during the processing of the EMV transaction TR1, during which it is appropriate to carry out the recharging of the battery 8.

In this example, the predetermined transaction command CMD1 requires a processing time long enough to allow a recharging of the battery up to at least a first predetermined threshold charge level TH1. As indicated below, the period during which this processing is carried out in the transaction offers favorable stability conditions of the power supply delivered by the terminal T.

The predetermined threshold charge level TH1 corresponds for example to at least 50% of the maximum charge capacity of the battery. For example, TH1 is equal to 50% or even 55% or 60% of the maximum charge capacity of the battery 8. This charge level TH1 is chosen so that the recharging can be triggered over a relatively short period of time within the context of the processing of a current transaction, while avoiding too short recharge phases (micro-recharging operations), harmful to the battery 8 performances and life.

In response to the predetermined transaction command CMD1 received (S32) coming from the terminal T, the smart card CD1 triggers (S34) the electrical recharging of the battery 8 by using a power supply delivered by the external terminal T. The smart card is thus capable of carrying out the recharging (S34) of the battery, from the external terminal, at the most appropriate moment of the transaction TR1.

According to the example described here, the predetermined transaction command CMD1 is not the RST message in accordance with the EMV standard, the command CMD1 being received after the RST message. The triggering of the recharging of the battery 8 is thus delayed relative to the beginning of the EMV transaction, in order to wait for a more favorable period of processing offering satisfactory stability conditions concerning the power supply provided by the external terminal.

Figure 5B:
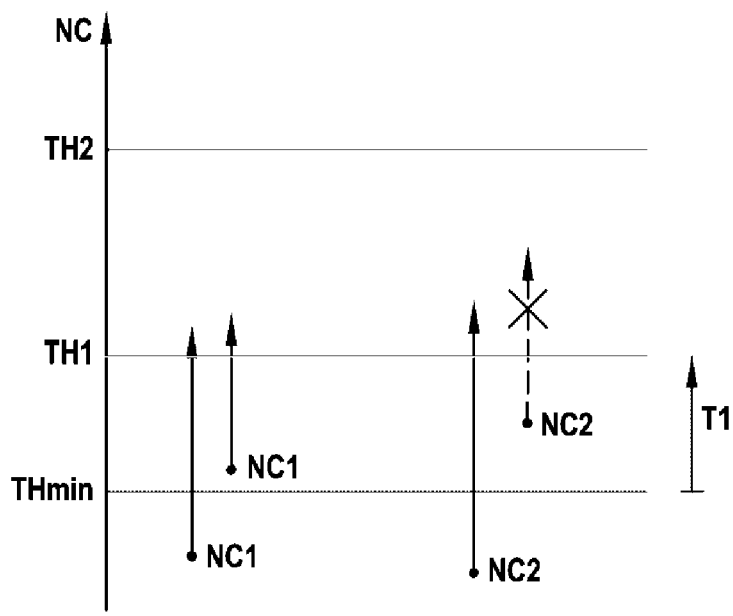

FIG. 5B illustrates for example a first case where the smart card CD1 detects in S32 that the command CMD1 is received and that its processing time is long enough to recharge the battery from its current charge level, noted NC1, up to at least the predetermined threshold charge level TH1. The recharging can continue as long as the smart card CD1 is not uncoupled from the terminal T, until reaching where necessary the level TH2 as described below.

According to one particular example, when a transaction command CMD1 is received at S32 (FIG. 5A), the smart card CD1 determines, from the current charge level NC of the battery 8, whether the processing time of this transaction is sufficient to allow a recharging of the battery 8 at least up to the predetermined threshold charge level TH1. The method continues in step S34 only if it is the case. In other words, in response to the detection that a transaction command CMD1 received requires a processing time, by the smart card CD1, sufficient to allow a recharging of the battery 8 at least up to the predetermined threshold charge level TH1, the smart card CD1 proceeds to the triggering step S34 as already described. Indeed, the recharge time to reach at least this level TH1 may vary depending on the current charge level of the battery. A given period of a current transaction may therefore be favorable to initiating the recharging of the battery only when the current charge level NC is in a certain range for example.

In one particular example, the smart card CD1 also verifies at S32 (FIG. 5A) whether the charge level NC is below a predetermined minimum charge level THmin. The smart card CD1 then triggers at S34 (FIG. 5A) the electrical recharging of the battery 8 only if the two following conditions are met:

a) receipt of a predetermined transaction command CMD1, this command requiring a processing time by the smart card CD1 which is long enough to allow a recharging of the battery 8 up to at least the first predetermined threshold charge level TH1; and b) the current charge level NC is below or equal to the predetermined minimum charge level THmin (THmin≤TH1).

In other words, according to this particular example, THmin defines a threshold value of the current charge level NC above which the smart card CD1 does not trigger the recharging of the battery 8. This allows the smart card CD1 to avoid triggering a recharging of the battery 8 unnecessarily if its current charge level NC is too close to its maximum charge capacity, so as to further reduce the risks of micro-recharging and preserve the battery life as much as possible.

In one particular example, the value THmin is set so that the difference (TH1−Thmin) represents at least 10%, or even 15% or 20%, of the maximum charge capacity of the battery.

FIG. 5B illustrates for example a second case where the smart card CD1 receives the command CMD1 and triggers the recharging of the battery 8 upon detecting that the current charge level, noted NC2, of the battery 8 is below or equal to the predetermined minimum charge level THmin and that the processing time of the command CMD1 is long enough to allow the recharging of the battery 8 from the current charge level NC2 up to at least the threshold charge level TH1.

Generally, to determine at S32 (FIG. 5A) whether a received command requires a processing by the smart card CD1 long enough to recharge the battery 8 up to at least the charge level TH1, the smart card CD1 may for example determine from the current charge level NC a recharge time required to reach at least the charge level TH1 by using the power supply of the terminal T and can then compare this estimated recharge time with a reference processing time required for the processing of the received command. The smart card CD1 triggers (S34, FIG. 5A) then the recharging of the battery 8 only if the reference processing time is greater than or equal to the estimated recharge time.

With reference to FIG. 5B, T1 denotes for example the time required to recharge the battery 8 from the predetermined minimum charge level THmin up to the first predetermined charge level TH1. According to one particular example, T1 thus corresponds to the minimum recharge time required to carry out a recharging by using the power supply delivered by the terminal T (in the case where the condition b) mentioned above is applied). The smart card CD1 can then verify at S32 (FIG. 5A) whether the reference processing time required to process the received command exceeds the time T1. From this time T1, it is thus possible to predefine the commands during a transaction that are likely to trigger a recharging of the battery 8.

Moreover, according to one particular example, the power supply of the external terminal T (FIG. 3) is delivered by contact via at least one external contact 8 connected to the terminal T, for example via the external contact 8 corresponding to the contact Vcc within the meaning of the ISO 7816 standard. It is thus possible to provide in a fast and efficient manner the embedded battery 8 with a stable power supply, which allows optimizing the performances of the battery 8 and reducing the recharge time.

According to one particular embodiment, during the recharging of the battery 8, the smart card CD1 monitors the charge level of the battery and verifies (S36) particularly whether a sufficient charge level is reached. In the example considered here, the smart card CD1 verifies during step S36 whether the battery 8 has reached a second predetermined threshold charge level TH2 (with TH2≥TH1). According to a particular example, TH1=TH2. According to another example, TH2>TH1.

Upon detecting (S36) that this second charge level TH2 is reached, the smart card CD1 causes stopping (S38) the recharging of the battery 8 by interrupting the supply delivered by the terminal T. The smart card CD1 can thus be configured so that the battery 8 is recharged to a desired level TH2 which goes beyond the required minimum charge level TH1 (FIGS. 5A-5B). This value TH2 may for example correspond to the maximum charge level (or maximum charge capacity) of the battery or to a level below it in order to avoid that the maximum charge level is reached, which could reduce the battery life. The recharging of the battery 8 can thus be stopped after having completed a full or almost full recharge cycle. By stopping the recharging once the threshold charge level TH2 is reached, stressing the battery 8 too much is avoided, which allows further extending its lifetime.

According to one particular example, the second threshold charge level TH2 corresponds to 80%, or even 85% or 90%, of the maximum charge capacity of the battery 8.

As already indicated, the invention makes it possible to implement an intelligent electrical recharging of the battery 8 by triggering the recharging at an appropriate moment in the current transaction TR1, so as to improve the performances of the battery 8. By triggering the recharging upon detection of the predefined transaction command CMD1, it is possible to choose a suitable period of time in the course of the transaction TR1 to perform the recharging, which makes it possible in particular to deliver a stable supply for a time sufficient to the battery 8 until at least a first desired charge level is reached.

The power supply delivered by the external terminal T may indeed be disturbed or even interrupted, while the battery 8 is still being recharged. The transaction TR1 can for example stop early because of a problem occurring during the transaction (coupling problem, refusal of the smart card to process the transaction, . . . ) or due to an unexpected stop of the transaction by the user that uncouples the smart card CD1 of the terminal T while the transaction is not completed.

The instability of the power supply or the unexpected interruption of the recharging process during a recharge phase can cause the accelerated aging of the battery and reduce its performances. By controlling the smart card so that is ensures the recharging of the battery for an adequate period of the EMV processing, the battery life and performances can be advantageously improved.

According to the invention, the smart card CD1 verifies whether a predetermined transaction command CMD1 is received, this command requiring a processing time, by the smart card, long enough to allow a recharging of the battery 8 to at least a first predetermined threshold charge level TH1. This assumes that the period during which the smart card CD1 processes this command CMD1 offers power stability conditions which are favorable to recharging the battery at least up to the charge level TH1. For that, the processing command CMD1 must be chosen accordingly. The processing of this command CMD1 for example makes early uncoupling of the smart card unlikely while the recharge phase of the battery is still in progress, thus limiting the risks of a recharging interruption already described above. This command can also be selected because of the low risk that, during the processing of the command, disturbances are likely to affect the power supply delivered by the terminal T to recharge the battery 8.

The battery life can be further extended by making sure that a recharging is triggered only if its current charge level is below a predetermined minimum charge level, as previously described.

According to one particular embodiment, it is also possible to increase the battery life by using a super-capacitor embedded in the smart card to accumulate the energy of several transactions before recharging the battery, for example once the accumulated energy reaches a predetermined threshold level. The recharging of the battery occurs for example off transaction that is to say while the smart card is not coupled with an external terminal. This particular mode, it is therefore the super-capacitor that is recharged at the appropriate moment during the processing of the transaction in cooperation with the external terminal. According to one particular example, the smart card comprises a battery system comprising the rechargeable battery and said supercapacitor, the latter being configured to accumulate energy during the recharging process during transactions, in accordance with the principle of the invention.

It is up to those skilled in the art to best choose the CMD1 transaction command marking the activation of the recharging of the battery 8, in particular according to the specificities of the battery and of the smart card, and also according to the implemented transaction protocol. This transaction command CMD1 must require a processing time, by the smart card CD1, which is long enough to allow a recharging of the battery to at least a first predetermined threshold charge level. Ideally, this processing time is subject to the fluctuations in the power supply delivered by the external terminal. The recharging can further be triggered (S32-S34, FIG. 5A) during a period where no component (processor or the like) of the smart card CD1, other than the battery 8, has a power consumption that exceeds a predetermined level, in order to ensure a stable power supply to the battery coming from the external terminal.

In the example of embodiment described above, the predetermined transaction command CM1 can be one among the following APDU commands within the meaning of the EMV standard: GPO, GAC, and VERIFY PIN (as already described above with reference to steps E12, E24 and E30 of FIG. 2).

The GPO, GAC and VERIFY PIN commands each require relatively long processing of the smart card CD1, period during which there is little or no interaction with the terminal T. During the processing of these predetermined transaction commands, it has been determined that a minimum of disturbances is likely to negatively affect the recharging of the battery 8 by the external terminal T. Thus, each of the GPO, GAC and VERIFY PIN commands requires a processing time, by the smart card CD1, which is in accordance with the EMV standard and which is particularly long enough to allow a recharging of the battery to at least the first threshold charge level TH1, from the power supply of the external terminal T.

For example, recharging the battery 8 during the period during which the user UR enters his PIN code on the external terminal T is advantageous in that there is little risk that the user UR terminates the transaction TR1 early by uncoupling for example the smart card CD1 and the terminal T. Also, it is advantageous to configure the smart card CD1 so that it causes the recharging of the battery in response to the transaction command GPO coming from the terminal T.

For similar reasons, it is advantageous to cause the recharging of the battery 8 in response to the detection, by the smart card CD1, of the transaction command GPO or GAC.

The risk that the processing of the transaction TR1 stops early is for example relatively high when establishing the coupling between the smart card CD1 and the terminal T1, that is to say at the beginning of the EMV protocol (exchange of the RST/ATR, steps E2-E4, FIG. 2) between the smart card CD1 and the terminal T1. Thanks to the invention, the recharging of the battery is not triggered instantly as soon as the coupling is achieved but later when the conditions for the recharging are more favorable.

The invention is also advantageous in that it is not necessary to modify the current transaction protocols (EMV in particular). The recharging of the battery 8 can be carried out in a transparent manner for the user UR that is to say without the latter noticing it or changing his habits since the recharging process is integrated in an intelligent way in the EMV protocol, without significantly disturbing or slowing down the latter.

In the example of embodiment described above with reference to FIG. 4, the transaction TR1 is processed according to the EMV protocol, although other implementations are possible. According to one particular example, the transaction TR1 is a payment transaction of the type EMV, MONEO (application purse) or GELDKARTE (application purse).

In one particular example, the transaction TR1 is carried out according to the EMV protocol defined by the specification "EMV Integrated Circuit CardSpecifications for PaymentSystems" (Book 3, Application Specification, Version 4.3 dating from November 2011).

According to one particular example, the transaction TR1 is carried out according to the MONEO protocol (electronic purse) defined by the specification "Electronic PURSE-MONEO-CardSpecification-PME-DSI9A-v2.5.2-22 Jan. 2002-DSI9A Version 2.5.2".

In the case where the transaction TR1 is a MONEO-type transaction, the predetermined transaction command CMD1 may be one among the following APDU commands: DEBIT (Instruction 0x34), DEBIT REVERSAL (Instruction 0x36) and VERIFY PIN (Instruction 0x20).

According to one particular example, the transaction TR1 is carried out according to the GELDKARTE protocol defined by the specification "GeldKarteApplikation-elektronischeGeldbörsefür SECCOS 6" (Version 1.3-21 Mar. 2011).

In the case where the transaction TR1 is a GELDKARTE-type transaction, the predetermined transaction command CMD1 can be one among the following APDU commands: DEBIT (Instruction 0x34) and REPAYMENT (Instruction 0x36).

In the example of embodiment described above with reference to FIG. 4, the power supply of the external terminal T is delivered by contact, for example via the external contact Vcc within the meaning of ISO 7816 standard. According to another example, it is possible to configure the smart card CD1 and the external terminal T for the latter to deliver to the battery 8 a contactless power supply, for example by electromagnetic induction, using the RF antenna 20 of the smart card CD1. According to one particular example, the smart card CD1 triggers the recharging of the battery 8 by using the power supply delivered by the external terminal T, both by contact (for example via the external contact 8 Vcc) and without contact (via the RF antenna 20). It is thus possible to accelerate the recharging process of the battery 8 and to ensure that the desired number n of recharge cycles is reached without unexpected interruption of the recharging. This variant is particularly advantageous in the case of the terminals T (payment terminals or the like) which are configured to emit RF signals even when communications with the smart card CD1 are made by contact.

According to another example of embodiment, the smart card DV1 cooperates in contactless mode with the terminal T to process the transaction TR1.

Figure 6:
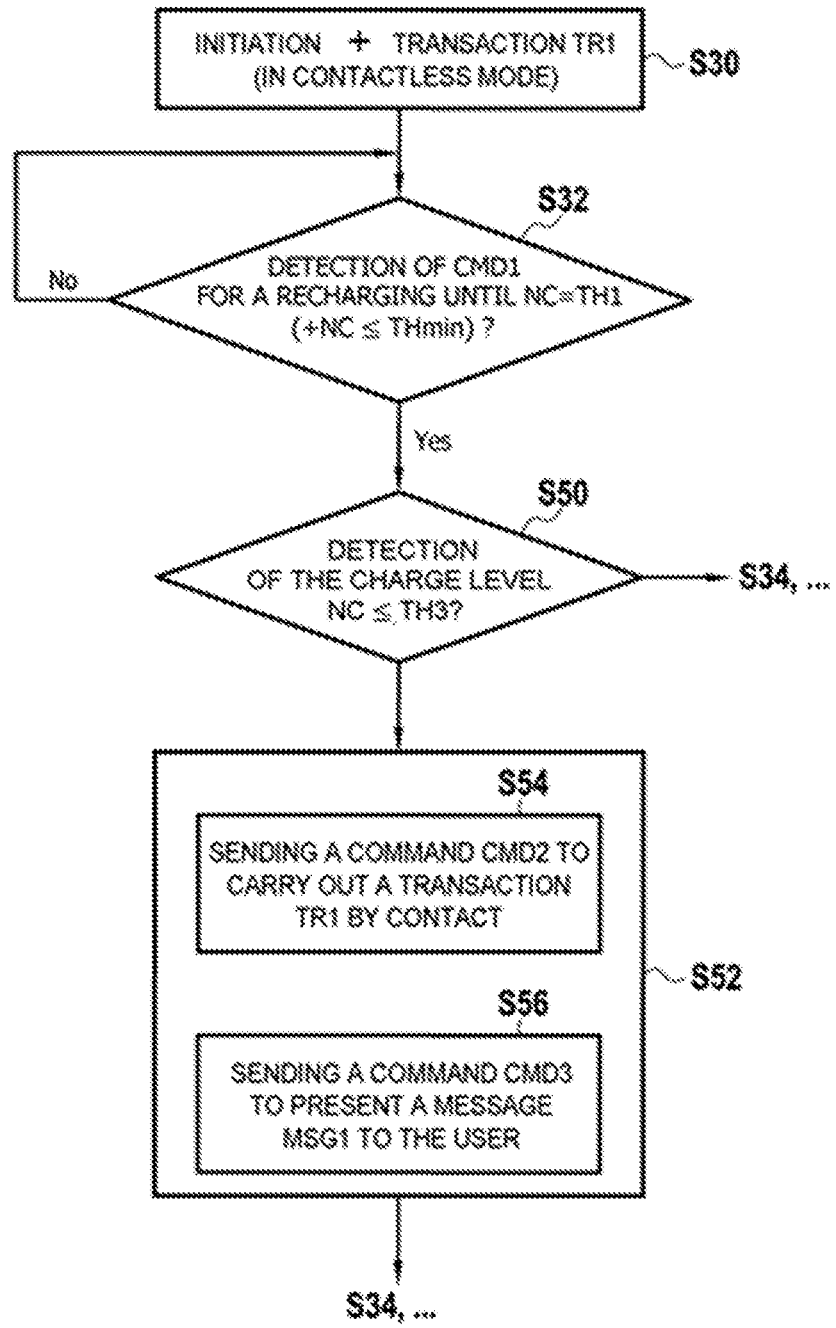
FIG. 6 represents, in the form of a flowchart, the steps of a control method according to one particular embodiment of the invention.

FIG. 6 represents an embodiment of the invention in which it is assumed that the smart card CD1 cooperates in contactless mode with the external terminal T to carry out the transaction TR1. In this example, the communication of the smart card CD1 with the terminal T is thus made by electromagnetic coupling.

First, the smart card CD1 performs steps S30 and S32 as already described above with reference in particular to FIGS. 3-4.

Once the predetermined transaction command CMD1 is detected (S32), the smart card CD1 determines (S50) whether the current charge level—noted NC—of the battery 8 is below or equal to a third threshold value TH3. If this is not the case, the smart card CD1 resumes the control method in step S34 as already described above.

If, on the other hand, the smart card CD1 detects (S50) that the current charge level NC of the battery 8 is such that: NC≤TH3, then the method continues in step S52 during which the smart card CD1 performs at least one predetermined action to force the processing by contact of the transaction TR1.

This third threshold charge level TH3 can be chosen so that TH3≤TH1.

More precisely, during step S52 (FIG. 6), the smart card CD1 can perform at least one of the following actions:
 action S54 during which the smart card CD1 transmits to the terminal T a command CMD2 requiring the processing by contact of the transaction TR1;
 action S56 during which the smart card CD1 transmits a command CMD3 to its user interface 12 to create the presentation to the user UR of a notification indicating that the current transaction (or a subsequent transaction) must be processed by contact.

Note that, according to one variant, the smart card CD1 can carry out the detection step S50 before step S32.

The invention thus advantageously makes it possible to force the processing by contact when the battery 8 requires a recharging, especially when the current charge level is particularly low, in order to be able to carry out the recharging by contact from the power supply of the terminal T. Although a contactless recharging is possible in some cases (see below), a recharging by contact is generally faster and allows limiting the recharge time, which is important particularly when the current charge level is particularly low.

According to one variant, step S50 is not performed and the smart card CD1 systematically performs step S52 represented in FIG. 6.

Figure 7:
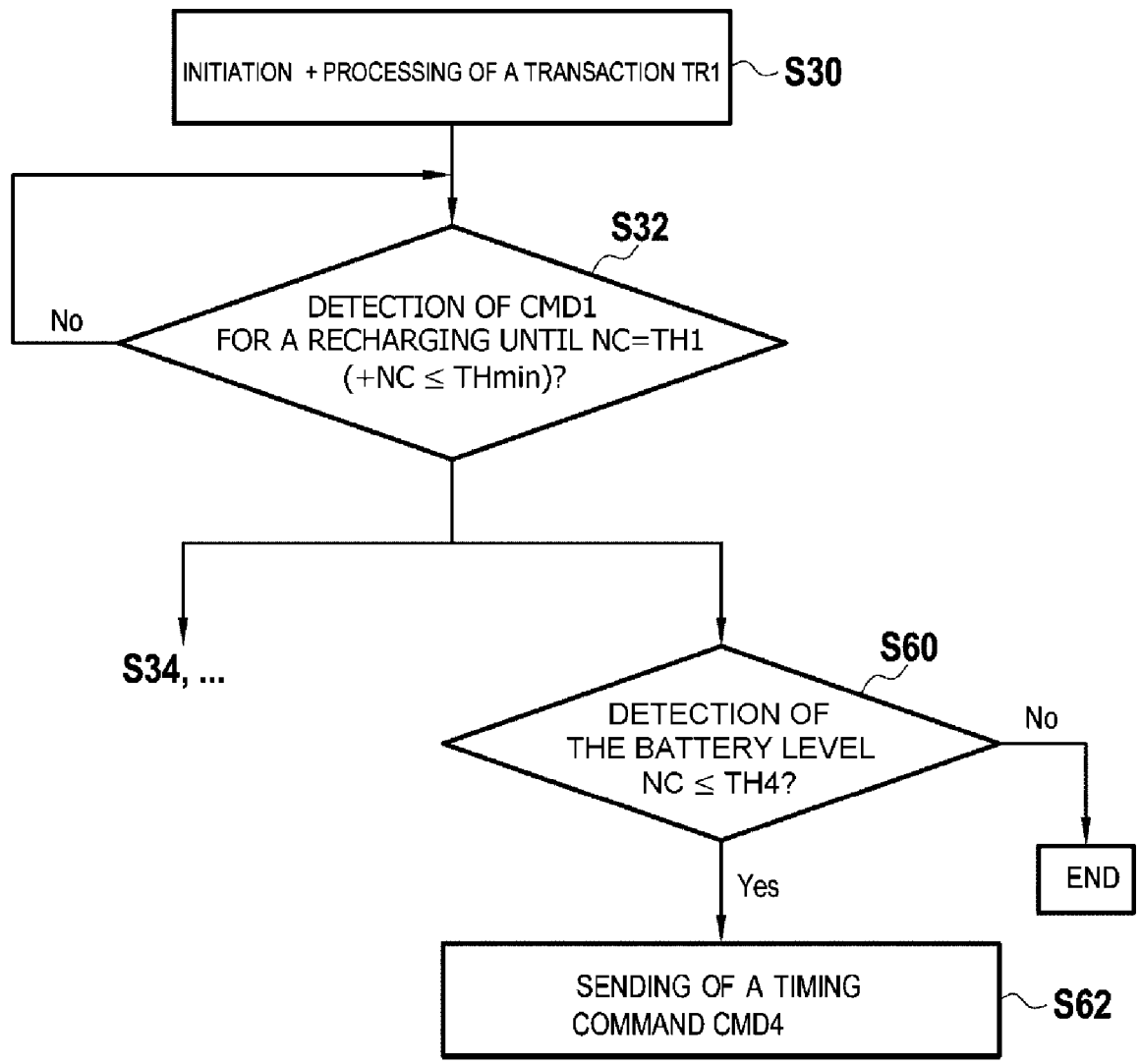
FIG. 7 represents, in the form of a flowchart, the steps of a control method according to one particular embodiment of the invention.

FIG. 7 represents one embodiment of the invention in which the smart card CD1 performs steps S30 and S32 as already described above, then performs steps S60 and S62 in parallel with (or before or after) the triggering S34 of the recharging the battery 8.

More precisely, upon detecting (S32) that the predetermined transaction command CMD1 is received, the smart card CD1 determines (S60) whether the current charge level—noted NC—of the battery 8 is below or equal to a fourth threshold value TH4. If this is the case (NC≤TH4), the smart card CD1 proceeds to step S62 during which it sends to the external terminal T a timing command CMD4 requiring that the terminal T artificially extends a processing time necessary to achieve a processing during the transaction TR1, so as to allow carrying out the recharging of the battery 8.

This timing command CMD4 may in particular indicate to the terminal T the processing step (in accordance with the EMV protocol or the like) during which the terminal T must maximize its processing time.

The invention thus makes it possible to maximize the period, during the processing of the transaction TR1, during which the smart card CD1 is likely to cause the recharging (S36) of the battery 8. It is thus possible to reach the threshold charge level TH1 (even beyond, until possibly reaching the charge level TH2) while limiting the risks that the recharging (S36) of the battery is interrupted before having reached the threshold charge level TH1. In other words, the invention makes it possible to avoid any power supply cutoff delivered by the terminal T which could negatively affect the recharging of the battery.

The terminal T may for example be configured to reset and/or end the transaction if it has no communication with the smart card CD1 during a predetermined period of inactivity, for example 1 second, which has the consequence of uncoupling the smart card and cut off the power supply delivered by the terminal T. To avoid such a power supply cutoff, the smart card CD1 may require additional time to process the transaction command CMD1, by sending a timing command CMD4.

The timing command CMD4 requires, for example, the extension of a processing time used by the external terminal T to carry out a processing within the limits authorized by the EMV standard (or the like).

The ISO 7816 defines in particular "PROCEDURE BYTE: 0x60" in the contact protocol, this corresponds to a message that the card must send regularly to the external terminal to inform it that it is always present (always coupled) and that it needs that the terminal allocates additional time thereto to complete its processing operations during the current transaction. This command "PROCEDURE BYTE: 0x60" may constitute an example of timing command within the meaning of the invention. For example, between the receipt of a GAC command and the return of the response to this GAC command, the smart card can be configured to send several "PROCEDURE BYTE: 0x60" commands (in T0) for the external terminal to understand that it must wait for the response to the GAC command.

The same principle can be applied within the context of the contactless EMV protocol: it is thus possible to use the "WTX (WAITING TIME EXTENSION)" command, well known to those skilled in the art.

The terminal T thus uses the maximum time authorized by the specification of the EMV protocol (or the like) for the terminal to perform a step of processing the transaction, in order to extend the available processing duration to recharge the battery in optimal conditions.

According to one variant, the smart card CD1 proceeds to step S62 without performing step S60. In other words, the smart card CD1 systematically sends a timing command CMD4 regardless of the charge level of the battery 8.

Figure 8:
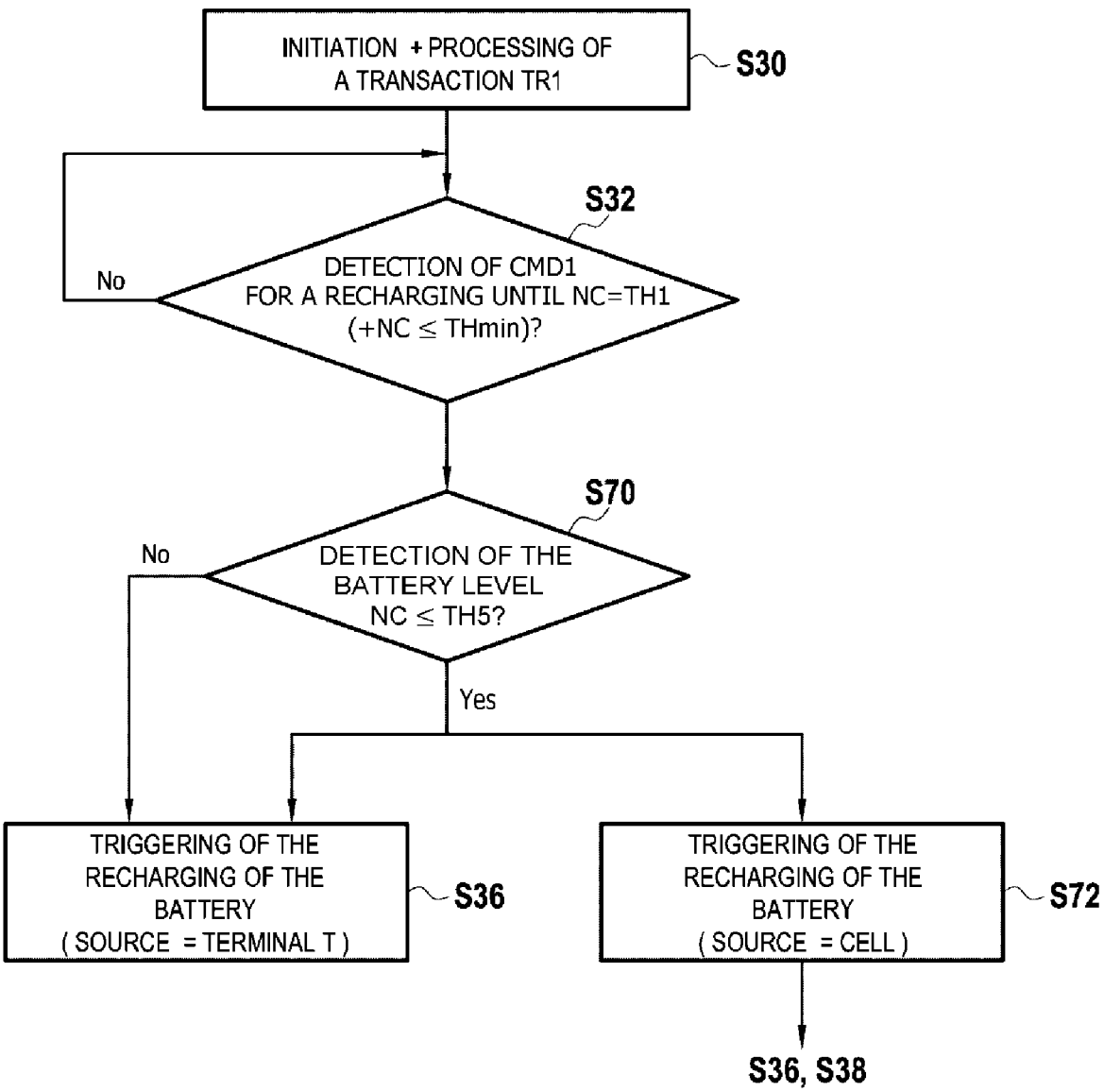
FIG. 8 represents, in the form of a flowchart, the steps of a control method according to one particular embodiment of the invention.

FIG. 8 represents an embodiment of the invention in which the smart card CD1 performs steps S30 and S32 as already described above, and then performs step S70. It is assumed here that the smart card CD1 includes the cell 18 (FIG. 3).

More specifically, upon detecting (S32) that the predetermined transaction command CMD1 is received, the smart card CD1 determines (S70) whether the current charge level NC is below or equal to a fifth threshold value TH5. If this is not the case (NC>TH5), the smart card CD1 continues the control method as already described above by triggering (S36) the recharging of the battery 8 from the power supply delivered by the terminal T.

If this is not the case (NC≤TH5), then the smart card CD1 proceeds to step S36 as already described above and in parallel with step S72. More precisely, in the case where the detection in S70 is positive (NC≤TH5), the smart card CD1 triggers (S36) the recharging of the battery 8 from the power supply delivered by the terminal T (by contact by example), and in parallel, triggers (S72) also the recharging of the battery 8 by using the power supply provided by the internal cell 18.

The threshold charge level TH5 may be such that TH5≤TH1.

The cell 18 is thus used as a secondary power source to recharge the battery, particularly when it has a very low charge level. By involving the cell 18, it is possible to reduce the recharge time of the battery, and thus to avoid slowing down excessively the processing of the current transaction TR1. The method thus makes it possible to recharge the battery, even when it is almost or completely depleted, while allowing the recharging process to be transparent to the user.

During step S72, the cell 18 can be activated to supplement (replace) or complement the power supply delivered by the terminal T.

According to one variant, the smart card CD1 systematically triggers (S72) the recharging of the battery 8 by the cell 18, as a complement to the power supply delivered by the terminal T, regardless of the current charge level NC of the battery 8.

According to one variant, during the recharging (S72) by the cell, upon detecting that the current charge level NC of the battery 8 increases until reaching a fourth threshold value, the smart card interrupts the recharging of the battery 8 by the cell so that the recharging of the battery 8 continues only from the power supply delivered by the external terminal T.

The invention thus allows ensuring that the battery 8 is recharged at a sufficient charge level while preserving to the maximum the cell 18 which is not rechargeable.

Those skilled in the art will understand that the embodiments and variants described above constitute only non-limiting examples of implementation of the invention. Particularly, those skilled in the art may consider any adaptation or combination of the embodiments and variants described above in order to meet a particular need.

The invention claimed is:

1. A control method implemented by a smart card including a battery that is rechargeable, the method comprising:
   processing a transaction during which the smart card communicates with an external terminal with which said smart card is coupled;
   receiving, during said processing of the transaction, a predetermined transaction command;
   detecting, from a current charge level of the battery, that said predetermined transaction command requires a processing time, by said smart card, long enough to allow a recharging of the battery to at least a first predetermined threshold charge level; and
   in response to said detecting, triggering the recharging of the battery by using a power supply delivered by the external terminal to reach at least the first predetermined threshold charge level during the processing time of the predetermined transaction command.

2. The method according to claim 1, wherein the first predetermined threshold charge level corresponds to at least 50% of the maximum charge capacity of the battery.

3. The method according to claim 1, wherein the smart card triggers said recharging upon receipt of said predetermined transaction command, only if the current charge level of the battery is below or equal to a predetermined minimum charge level.

4. The method according to claim 3, wherein:
   the transaction is a MONEO-type transaction, said predetermined transaction command being one among the following APDU commands: DEBIT, DEBIT REVERSAL and VERIFY PIN;
   or
   the transaction is a GELDKARTE-type transaction, said predetermined transaction command being one among the following APDU commands: DEBIT and REPAYMENT.

5. The method according to claim 1, wherein the transaction is an EMV-type transaction, said predetermined transaction command being one among the following APDU commands within the meaning of the EMV standard:
   GPO;
   GAC; and
   VERIFY PIN.

6. The method according to claim 1, wherein the method further comprises:
   stopping the recharging of the battery upon detecting that the charge level of the battery has reached a second predetermined threshold charge level, greater than or equal to the first predetermined threshold charge level.

7. The method according to claim 1, wherein the power supply is received, from the external terminal, by external contact.

8. The method according to claim 7, wherein the smart card is of the type ISO 7816, the power supply being received, from the external terminal, by contact via a Vcc contact connected to the external terminal.

9. The method according to claim 7, wherein the smart card triggers the recharging of the battery, simultaneously by contact and without contact, from the external terminal.

10. The method according to claim 1, wherein the method further comprises, prior to said triggering the recharging of the battery:
    upon detecting that the charge level of the battery is below a second predetermined threshold charge level, sending to the external terminal a first command requiring that the transaction is processed by contact.

11. The method according to claim 10, wherein the method further comprises, prior to said triggering the recharging of the battery:
    upon detecting that the charge level of the battery is below the second predetermined threshold charge level, sending a second command to a user interface of the smart card to create a presentation to a user of a notification indicating that the transaction must be processed by contact.

12. The method according to claim 1, further comprising:
    sending to the external terminal a timing command requiring that the external terminal artificially extends a processing time necessary to carry out a processing during said transaction, so as to allow carrying out said recharging of the battery.

13. The method according to claim 12, wherein the transaction is of the EMV type, and the timing command requiring the extension of a processing time used by said external terminal to perform a processing within the limits authorized by the EMV standard.

14. The method according to claim 1, wherein the smart card comprises a non-rechargeable cell, the method further comprising:
    upon detecting that the charge level of the battery is below a second predetermined threshold charge level, triggering the recharging of the battery from the non-rechargeable cell to supplement or complement the power supply delivered by the external terminal.

15. A smart card comprising:
    a rechargeable battery;

a processing module configured to process a transaction during which the smart card communicates with an external terminal with which said smart card is coupled;

a communication module configured to receive, during said processing of the transaction, a predetermined transaction command and to detect, from a current charge level of the battery, that said predetermined transaction command requires a processing time, by said smart card, long enough to allow a recharging of the battery to at least a first predetermined threshold charge level; and a control module configured, in response to said detection that the predetermined transaction command requires a processing time long enough to allow a recharging of the battery to at least a first predetermined threshold charge level, to trigger the recharging of the battery by using a power supply delivered by the external terminal in order to reach at least the first predetermined threshold charge level during the processing time of the predetermined transaction command.

\* \* \* \* \*